June 7, 1938.  P. ROBINSON ET AL  2,119,628
ELECTROLYTIC DEVICE
Filed July 9, 1936
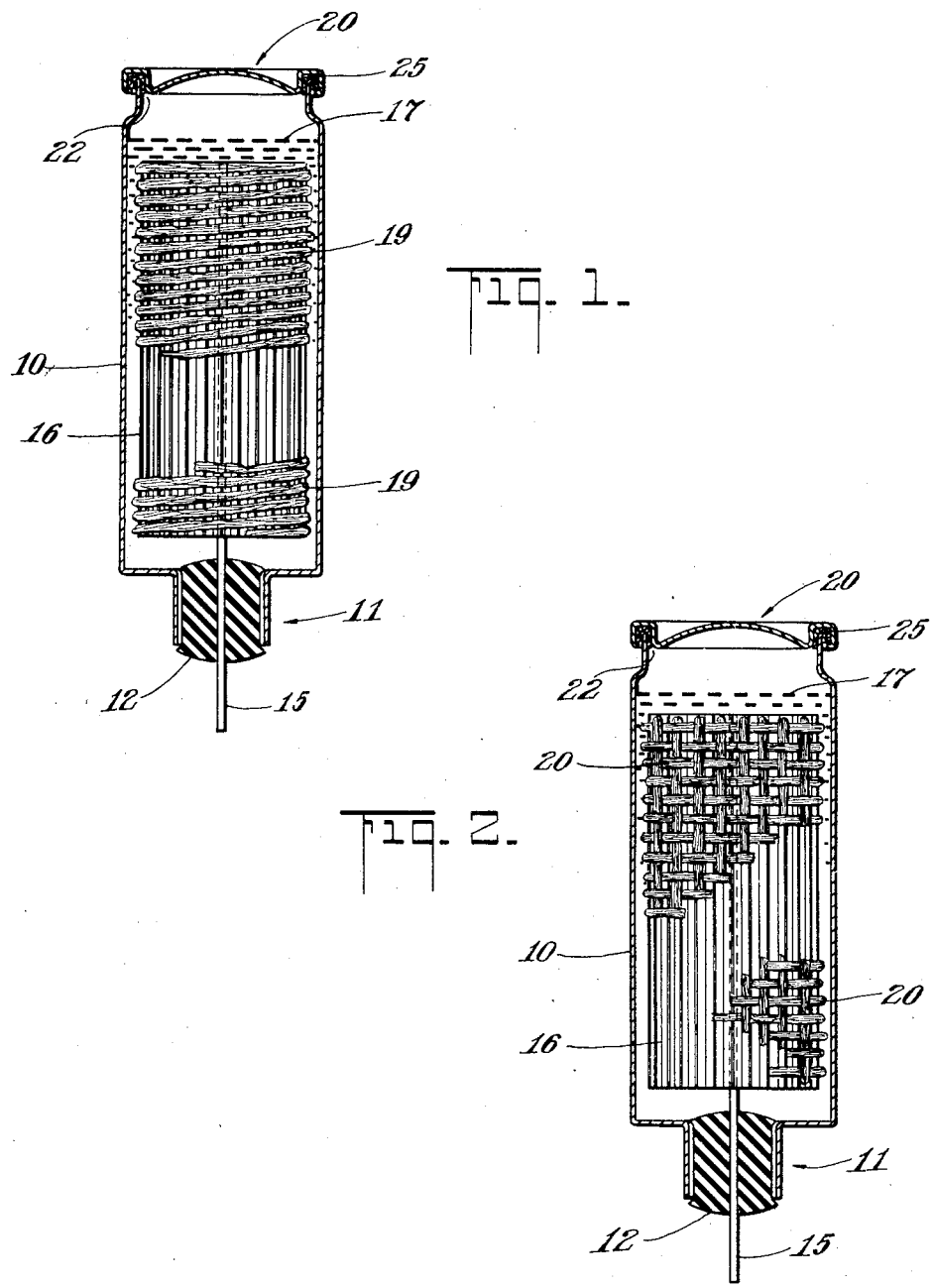
INVENTORS
PRESTON ROBINSON
JOSEPH L. COLLINS
BY Dorsey & Cole
ATTORNEYS Patented June 7, 1938

2,119,628

UNITED STATES PATENT OFFICE 2,119,628

ELECTROLYTIC DEVICE

Preston Robinson, Williamstown, and Joseph L. Collins, North Adams, Mass., assignors to Sprague Specialties Company, North Adams, Mass., a corporation of Massachusetts Application July 9, 1936, Serial No. 89,820

4 Claims. (Cl. 175—315)

The present invention relates to electrolytic devices, and will be described in connection with electrolytic condensers having fluid electrolytes, for which it is of particular importance.

More particularly, the invention relates to novel spacing or separating means to mechanically separate and electrically insulate from each other electrodes or other elements of electrical condensers which have different polarities or if of the same polarities are connected to different voltages.

The novel spacing means according to the invention are inexpensive; are resistant to the commonly used electrolytes employed in such condensers; can be made up in the desired shape and thickness; have a high porosity, and in general meet the requirements for such spacers, more fully set forth in the copending application Ser. No. 86,162 of Jos. L. Collins, Frederick W. McNamara, and Frederick E. Crosier, filed June 19, 1936.

In accordance with the invention, we provide a spacer of vitreous material, preferably glass in the form of so-called glass-wool, which is glass formed of exceedingly thin fibres; the glass fibres may be wound into threads or loosely woven into fabrics, and porosities as high as 85% can be obtained; i. e., the cross section of such spacer will be 15% solid and 85% void. However, as the usual glass composition used for glass-wool comprises as a rule a considerable excess of alkaline constituents, which if it were placed in contact with the commonly used electrolytes for electrolytic condensers, which are normally of slightly acidic character, a reaction would take place which might bring into the electrolyte undesired constituents, and also cause the electrolyte to become more alkaline than desired, we prefer to use for the glass-wool glass compositions which are characterized as having an excess of acid constituents such as silica $SiO_2$, boron oxide $B_2O_3$, etc. Also the pyrex type or quartz types of glass compositions can be successfully used.

With glass-wool of such composition, the electrolytes generally used in electrolytic condensers, namely electrolytes having a pH of usually less than 7, will not react at normal operating temaatures during the normal life of the condenser. Such electrolytes consist as a rule of an aqueous solution of weak acids like boric acid, phosphoric acid, citric acid, etc., with or without the addition of a salts of such weak acid, for example ammonium or alkaline salts of such acids.

In case the glass, as is usually done for bringing it into its fibrous state, is treated with some adhesive so as to facilitate the relative movement of the fibres during manufacture, we prefer to use as adhesive, substances which are harmless to the electrolytes used in the condensers, for example dextrine.

As it occurs that the glass-wool, whatever its composition may be, may contain a small amount of free alkali on its surface, we find it desirable to subject the glass-wool before using same in the condenser, to a treatment in an acidic solution the pH of which is slightly smaller (i. e., the acidity of which is slightly greater) than that of the electrolyte in which it is used.

For such treatment of glass-wool we may use a dilute solution of nitric acid, and after such treatment subject the glass-wool to careful rinsing with water so as to wash off all traces of the nitric acid.

In the drawing forming part of the specification, two embodiments of our invention are shown.

Figure 1 is a cross-sectional side view of a condenser having a spacer in accordance with the invention;

Fig. 2 is a cross-sectional side view of a condenser identical in structure to that of Fig. 1, but using a spacer of a somewhat different construction.

Referring to Fig. 1, the condenser comprises a container 10 of filming metal, as aluminum, or non-filming metal, as copper, which constitute the cathode and is provided at one end with a reduced neck or tubular extension 11. The seal provided in the extension 11 consists of a plug 12 of rubber or other resilient material, filling and preferably also slightly extending, both inwardly and outwardly, beyond the tubular extension 11.

The plug 12 is provided with a bore through which protrudes the end of a support 15 of an anode 16, said support being secured in place by crimping the neck 11. The container is almost completely filled with a suitable liquid electrolyte 17, for example, in case of aluminum containers, with an aqueous solution of ammonium borate containing also free boric acid.

The other end of the container is provided with a crowned cap 20 of metal, which fits into the container 10 at 22. A vent gasket 25 formed of wax-impregnated cloth is interposed between the container 10 and the cap 20, and the free edge of the cap 20 with the gasket 25 interposed, is crimped over a rim provided on the container 20.

The anode 16 carried by the support 15 consists of an aluminum sheet or foil of relatively small thickness folded back and forth upon itself in the manner of accordion pleating, and is riveted or otherwise secured to the support 15.

Surrounding the anode 16 is a spacer or separator 19 made in accordance with the invention and consisting of fibres of glass-wool, a plurality of fibres being wound together to form threads, and the threads surrounding the anode as an open helix. The threads have an over-all thickness of the order of $1/64''$ to $\frac{1}{32}''$, the smaller thicknesses being generally used for low-voltage condensers (below 250 volts), and the greater thicknesses for high-voltage condensers (up to 500 or 600 volts). The diameter or thickness of the thread as a rule substantially corresponds to the minimum interspace between the anode 16 and the cathode 18.

As has been stated before, the glass-wool is made of a glass composition, and an adhesive is used in its manufacture which does not deleteriously affect or react with the electrolyte.

Instead of forming threads, the fibre may be woven into a loosely-woven sheet 20, which, as shown in Fig. 2, surrounds as a cylinder the anode. The thickness of the woven glass-wool sheet is of the same order as of the thread used in the spacer of Fig. 1.

As has been stated, before the glass-wool spacer is immersed in the electrolyte it is subjected to acidic cleaning in an acid having a slightly higher pH than the electrolyte used in the condenser, so as to remove all free alkaline from the surface of the glass-wool, but after such acidic treatment the glass-wool is rinsed with water so as to remove all traces of the acid.

It should be noted that the glass-wool spacers having proper compositions selected in accordance with the electrolytes in which they are to be used, can be used in various other forms than above described. Such spacers are characterized by being comparatively inexpensive, having high porosity and good insulating and mechanical properties.

As various modifications of the invention are possible to those skilled in the art without departing from the spirit of the invention, we wish the appended claims to be construed as broadly as permissible in view of the prior art.

What we claim is:

1. An electrolytic condenser comprising a filmed electrode and a second electrode, and an electrolyte having a pH less than 7, and a separator of vitreous material interposed between said electrodes, said vitreous material having an excess of acidic constituents.

2. An electrolytic condenser comprising a filming electrode and another electrode, and an electrolyte having a pH less than 7, and a separator interposed between said electrodes, said separator consisting of glass fibres having a glass composition which is predominantly acid in its character, and an adhesive suitable to facilitate relative movement of glass fibres and which is not injurious to the electrolyte.

3. A spacer for electrolytic condenser consisting of glass fibres of a glass the composition of which is acidic in character.

4. In the manufacture of electrolytic condensers, the process which comprises, assembling in an electrolyte of acidic character a filmed electrode and another electrode, forming of glass fibres a separator for said electrodes, subjecting said separator to an acidic treatment in an acid having a lower pH than the pH of the electrolyte, removing traces of said acid from said separator by a washing operation, and inserting said treated and washed separator between said electrodes.

PRESTON ROBINSON.
JOSEPH L. COLLINS.